Figure 7:
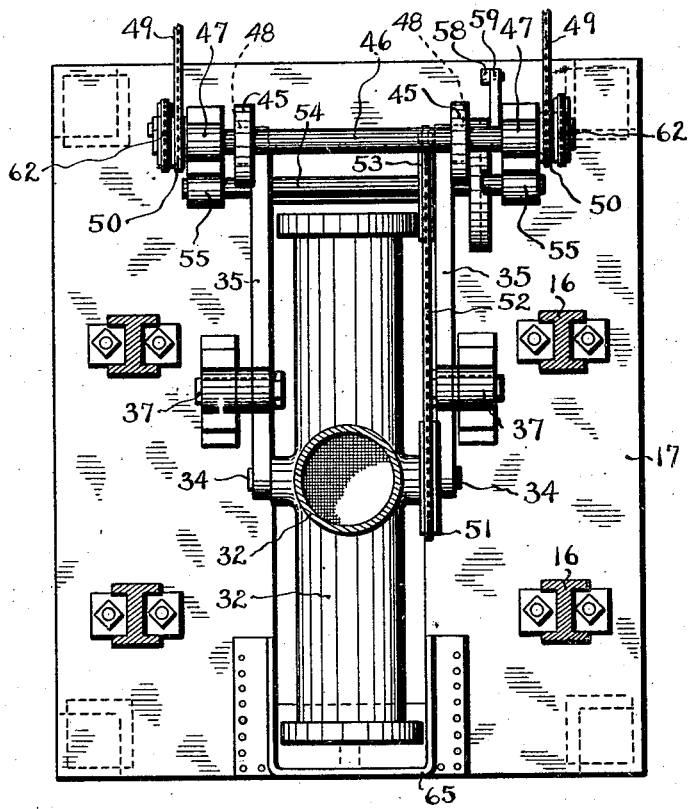

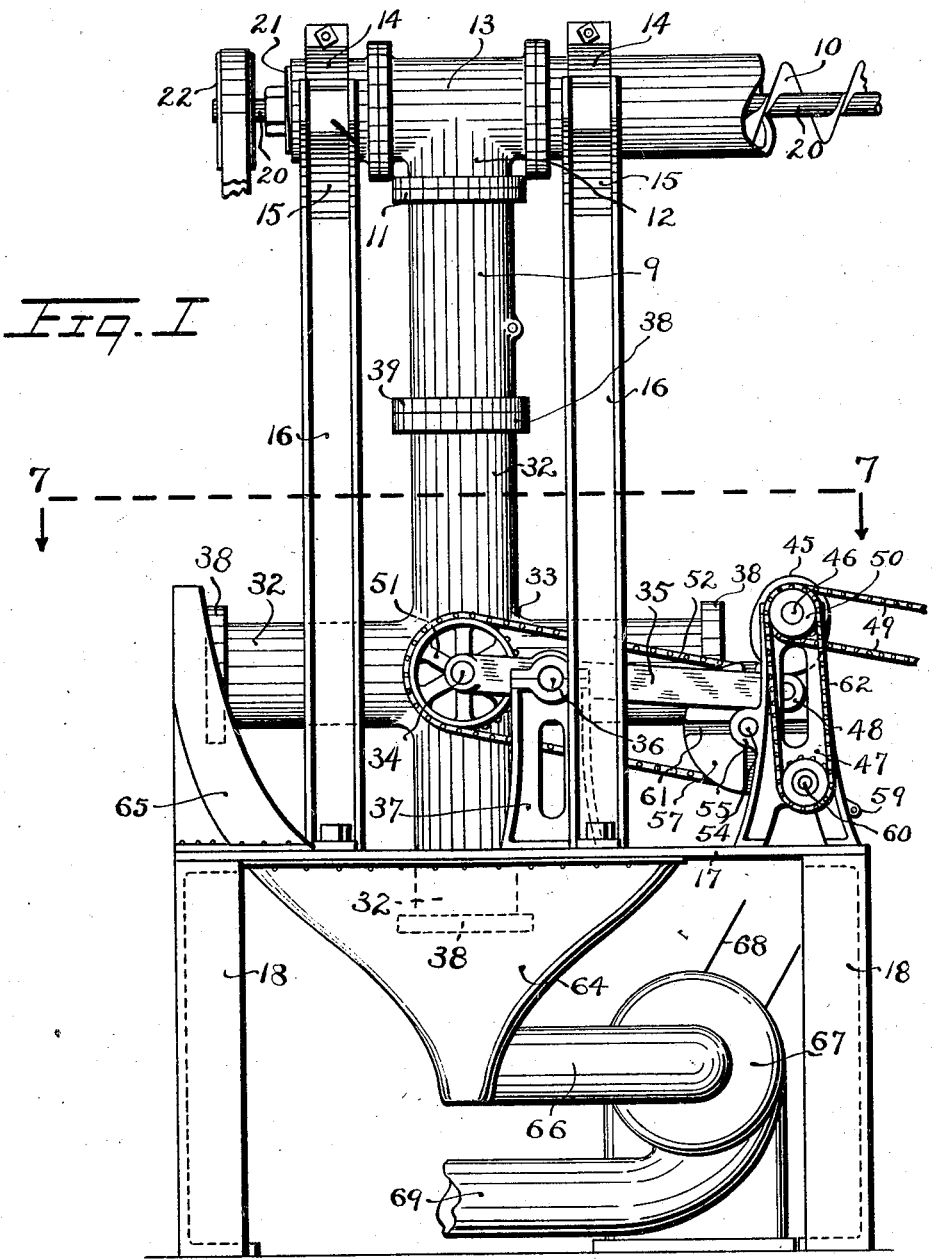

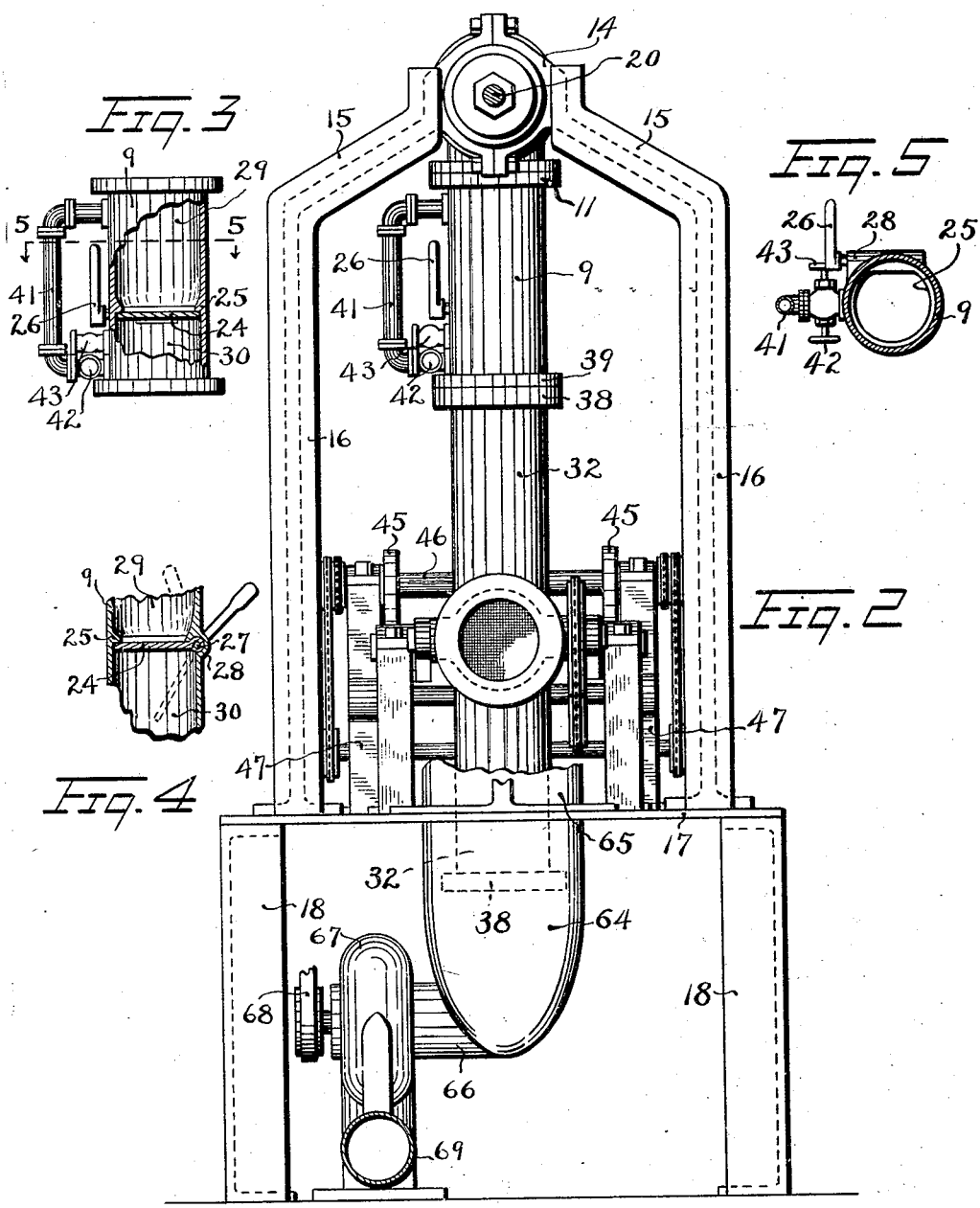

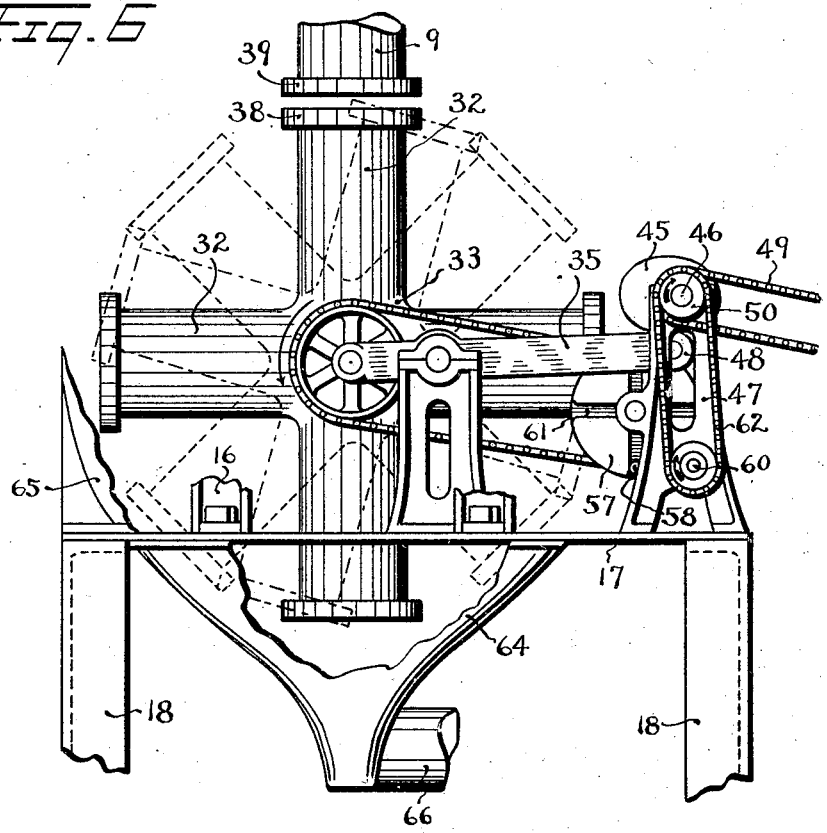

July 16, 1929. E. PAYNE 1,721,258
APPARATUS FOR TRANSFERRING POWDER AND THE LIKE
Filed May 12, 1927 4 Sheets-Sheet 4

Patented July 16, 1929.

1,721,258

UNITED STATES PATENT OFFICE.

EARL PAYNE, OF SPRINGVILLE, NEW YORK, ASSIGNOR TO THE BORDEN COMPANY, OF NEW YORK, N. Y., A CORPORATION OF NEW JERSEY.

APPARATUS FOR TRANSFERRING POWDER AND THE LIKE.

Application filed May 12, 1927. Serial No. 190,718.

The invention relates to an improvement in apparatus for transferring powder and the like, and more particularly to an improvement in apparatus for transferring powdered milk or the like from a vacuum chamber or reservoir to a point under atmospheric pressure from which it is transported for further treatment.

The object of the invention is to produce an improved and simplified apparatus of this character which will efficiently transfer the powder from the space under vacuum to the point at atmospheric pressure with a minimum loss of vacuum. To this end the invention consists in the improved apparatus for transferring powder and the like hereinafter described and particularly pointed out in the appended claims.

In the accompanying drawings illustrating the preferred form of the invention, Fig. 1 is a side elevation of the apparatus; Fig. 2 is a front elevation of the apparatus, looking from the left in Fig. 1; Fig. 3 is a detail, partly in side elevation and partly in section, of the vacuum chamber or reservoir; Fig. 4 is a sectional detail of the flap valve for retaining powder in the reservoir; Fig. 5 is a section taken along the line 5—5 of Fig. 3; Fig. 6 is a side elevation, with parts broken away, of the device for transferring the powder from the reservoir to the hopper of the blower; and Fig. 7 is a sectional plan view of the apparatus, taken on the line 7—7 of Fig. 1.

The improved powder transferring apparatus, as illustrated in the drawings, comprises a vacuum chamber or reservoir 9 into which the powder is fed by a screw conveyor 10. The reservoir 9 is a vertically arranged cylindrical receptacle which is connected at its upper flanged end 11 with the downwardly directed discharge opening 12 of the conveyor cylinder 13 in which the conveyor 10 is located. The conveyor cylinder 13 is supported by the split rings 14 from the upper inturned ends 15 of uprights 16 rising from the table 17 resting on top of the legs 18. The shaft 20 of the conveyor 10 projects through a bushing 21 at the forward end of the cylinder 13 and carries on its end a belt driven pulley 22.

The powder is held in the reservoir 9 by a flap valve 24 the rim of which bears against the lower edge of a circumferential flange 25 formed on the interior wall of the reservoir. The valve flap 24 is manipulated and is normally held in operative position, as shown in Figs. 3 and 4, by means of a handle 26 fixed to the shaft 27 which passes through one edge of the flap 24 and is journaled in the boss 28 formed in one side of the reservoir. The valve flap 24 divides the reservoir 9 into an upper chamber 29 which opens into the conveyor cylinder 13 and a lower chamber 30 through which the powder accumulating in the upper chamber 29 is discharged. The vacuum maintained in the conveyor cylinder 13, and thus in the upper chamber 29, is sufficient to permit the flap 24 to be held in operative position retaining the powder in the upper chamber 29 so long as the chamber 30 is under atmospheric pressure. When, however, the chamber 30 is put under substantially the same pressure as the chamber 29 the weight of the powder in the chamber 29 will depress the flap 24 and permit the powder in the chamber 29 to be discharged through the chamber 30.

The powder discharged from the reservoir 9 is received in one of the pockets 32 of the rotatable member 33 provided at its center with the trunnions 34 journaled in the forward ends of the lever arms 35 pivoted at 36 in the upper ends of the uprights 37 rising from the table 17. The member 33 is arranged to be actuated intermittently to bring the outer flanged ends 38 of the pockets 32 successively into alinement with the lower flanged end 39 of the reservoir 9. Each pocket 32 of the rotatable member 33 is a closed receptacle open only at its outer end. Hence when the flanged outer end 38 of a pocket 32 has made an air-tight connection with the flanged lower end of the reservoir 9, the pocket constitutes a downward extension of the chamber 30 of the reservoir 9 and under this condition the chamber 30 can be put under vacuum to permit the powder to be discharged from the chamber 29 into the pocket.

The means for putting the chamber 30 under substantially the same pressure which exists in the chamber 29 comprises a conduit or pipe 41 connected at its upper end with the chamber 29 and at its lower end with the chamber 30, thereby forming a by-pass around the flap valve 24. In the lower part of the conduit 41 is a valve 42. When a pocket 32 has been brought into alinement and contact with the reservoir 9 to receive a charge of powder therefrom, the operator opens the valve 42, thereby permitting the air in the chamber 30 and in the alined pocket 32 to be drawn out through the chamber 29 by the means which keeps the conveyor cylinder 13 under vacuum. When the supply of powder in the reservoir 9 has fallen into the alined pocket 32, the operator closes the flap valve 24 and shuts the valve 42, thereby cutting off the chamber 30 and the alined pocket 32 from the vacuumizing means. He then opens the valve 43 which connects the chamber 30 with the atmosphere to break the vacuum in the chamber 30 and the pocket 32 to permit the latter to be disconnected from the reservoir 9. The valve 43 is then closed again.

To bring a pocket 32 of the rotatable member 33 into alinement with the reservoir 9 to receive a charge of powder, the member 33 is raised as a whole. After the pocket has received the charge of powder from the reservoir and before the member 33 is again rotated it is lowered to free the flanged end 38 of the pocket from the flanged lower end 39 of the reservoir. The means for raising and lowering the rotatable member 33 comprises the two cams 45 mounted on the shaft 46 journaled in the upper ends of the uprights 47 supported from the table 17. The cams 45 engage with the cam rolls 48 carried by the outer ends of the lever arms 35. The weight of the rotatable member 33 holds the cam rolls 48 against the cams 45. When the active parts of the cams 45 engage with the cam rolls 48 the ends of the lever arms 35 are depressed, thereby lifting the rotatable member 33 to bring the alined pocket 32 into contact with the open lower end of reservoir 9, as shown in Fig. 1. When on the other hand, the idle part of the cams 45 moves opposite the cam rolls 48 thereby permitting the outer ends of the lever arms 35 to rise, the weight of the rotatable member 33 causes it to descend and free the upper end of the alined pocket 32 from the lower end of the reservoir 9 to permit the rotation of the member 33. The shaft 46 is driven constantly by means of the chains 49 which pass over the sprocket wheels 50 fixed on the shaft 46. The chains 49 may be driven from any convenient source of constant power.

The member 33 is rotated intermittently in timed relation with its up and down movements. For this purpose a sprocket wheel 51 is fixedly mounted on one of the trunnions 34 and is driven by a chain 52 which passes over a sprocket wheel 53 fixed on the shaft 54 journaled in the bosses 55 formed on the uprights 47. Fixed on the shaft 54 is a slotted disk 57 forming part of a Geneva gear movement. A roll 58 mounted on the outer end of an arm 59 fixed on a shaft 60 journaled in the lower part of the uprights 47 is adapted to successively enter the slots 61 of the disk 57 and thereby turn the disk 57 through a quarter rotation for each complete revolution of the arm 59. The shaft 60 is driven constantly from the shaft 46 by means of the chains 62. The slots 61 of the disk 57 and the arm 59 are arranged relatively to the cams 45 so that while the rotatable member 33 is being lifted or lowered the roll 58 is passing through the inactive part of its path of travel. And while the idle parts of the cams 45 are in engagement with the cam rolls 48, after the member 33 has been lowered, the roll 58 by engaging one of the slots 61 of the disk 57 acts to turn the disk through a quarter rotation and thereby effect a quarter rotation of the member 33 in a counterclockwise direction.

The pockets 32 of the member 33 discharge into a hopper 64. The hopper 64 is an elongated cone-shaped member open at its upper end and supported from the under side of the table 17. The outer discharge end of each pocket 32 is received within the hopper 64 as clearly indicated in Fig. 6. The pockets 32 begin discharging their load of powder into the hopper 64 when they have reached substantially the horizontal position, and for this reason a guard or shield 65 is provided to direct any powder falling out of the pockets into the hopper 64.

The lower or discharge end of the hopper 64 is connected by a pipe 66 with the intake of a blower 67 driven by a belt 68. The blower 67 discharges through a pipe 69 which directs the powder to the point at which it is to be further treated.

The mode of operation of the improved powder transferring apparatus is as follows:—It is assumed that the flap valve 24 is in operative position retaining the powder within the reservoir 9 and that the valves 42 and 43 are both closed. On the completion of each quarter rotation of the disk 57 by the arm 59 a pocket 32 of the member 33 is left in alinement with the reservoir 9. While the arm 59 is passing through a part of the idle portion of its path of travel, the active parts of the cams 45 are in engagement with the cam rolls 48 depressing the outer ends of the lever arms 35, thereby raising the forward ends of the lever arms 35 and lifting the rotatable member 33 to bring the flanged end 38 of the alined pocket 32 into contact with the lower flanged end 39 of the reservoir 9. When the connection between the alined pocket 32 and the reservoir 9 has been effected, the operator opens the valve 42, thereby establishing substantially the same pressure on both sides of the valve flap 24. Thereupon the weight of the powder on the upper surface of the flap 24 swings it downwardly and the powder is discharged into the pocket 32. The operator then swings the flap 24 into operative, powder retaining position, closes the valve 42, and opens the valve 43 to break the vacuum in the chamber 30 and the pocket 32. By this time the depressed portions of the cams 45 approach the cam rolls 48, permitting the member 33 to descend by gravity and free the upper end of the alined pocket 32 from the lower end of the reservoir 9. By the time the full separation of the pocket from the reservoir is effected, the rotation of the shaft 60 has brought the roll 58 into engagement with the next succeeding slot 61 of the disk 57, thereby causing the powder carrying pocket to be moved into horizontal position with its flanged outer end received within the upper end of the shield 65. While the powder carrying pocket is passing from the horizontal position to the inverted vertical position with its lower end received within the hopper 64 it discharges its contents into the hopper, whence it is conveyed away by the blower 67 for further treatment.

Having thus described the invention what I claim as new is:—

1. A powder transferring device comprising, a reservoir adapted to hold powder, a rotatable member having a series of radial pockets open at their outer ends, means for rotating the member to bring the radial pockets thereof into alinement with the reservoir, and means effective when a pocket is in alinement with the reservoir to raise the member to bring the open end of the alined pocket in contact with the reservoir and for lowering the member to disengage the pocket from the reservoir.

2. An apparatus for transferring powder and the like comprising, a vertically arranged reservoir open at its upper and lower ends, a valve located in the reservoir for holding powder in the upper part thereof, means for feeding powder into the upper part of the reservoir, a rotatable member having radial pockets with open outer ends, means for rotating the member to bring the pockets successively in alinement with the reservoir, means effective when a pocket is in alinement with the reservoir to raise the member to contact the open upper end of the alined pocket with the open lower end of the reservoir and for lowering the member to disengage the alined pocket from the reservoir, means for establishing equality of air pressure on the upper and lower sides of the valve in the reservoir, and powder receiving means located under the rotatable member.

3. An apparatus for transferring powder and the like comprising, a vertically arranged reservoir having an open lower end, a rotatable member having radial pockets with open outer ends, means for rotating the member to bring the pockets successively into alinement with the reservoir, means effective when a pocket is in alinement with the reservoir to raise the member to contact the open upper end of the alined pocket with the open lower end of the reservoir and for lowering the member to disengage the alined pocket from the reservoir, powder receiving means located under the rotatable member, and means for feeding powder into the reservoir.

4. An apparatus for transferring powder and the like comprising, a reservoir having an open lower end, a rotatable member having a series of radial pockets with open outer ends, two pivotally mounted arms on the forward ends of which the rotatable members is journaled, rolls carried by the other ends of the arms, cams for engaging the rolls to raise and lower the rotatable member, and means operating in timed relation with the cams for turning the rotatable member through a quarter rotation at a time to bring the pockets successively into alinement with the reservoir.

5. An apparatus for transferring powder and the like comprising, a reservoir having an open lower end, a series of pockets having open ends arranged to be successively brought into alinement with the reservoir, means for raising an alined pocket into contact with the reservoir and for lowering it out of contact therewith, means for feeding powder through the reservoir into the pocket in contact therewith, and means for moving the pocket after it has been disengaged from the reservoir to empty the contents thereof.

EARL PAYNE.